Nov. 1, 1966  F. J. THOMAS  3,282,470
AUTOMATIC SALT DISPENSER FOR POPCORN MACHINES
Original Filed May 13, 1963  2 Sheets-Sheet 1

INVENTOR.
Frank J. Thomas
BY
Hovey, Schmidt, Johnson & Hovey
ATTORNEYS.

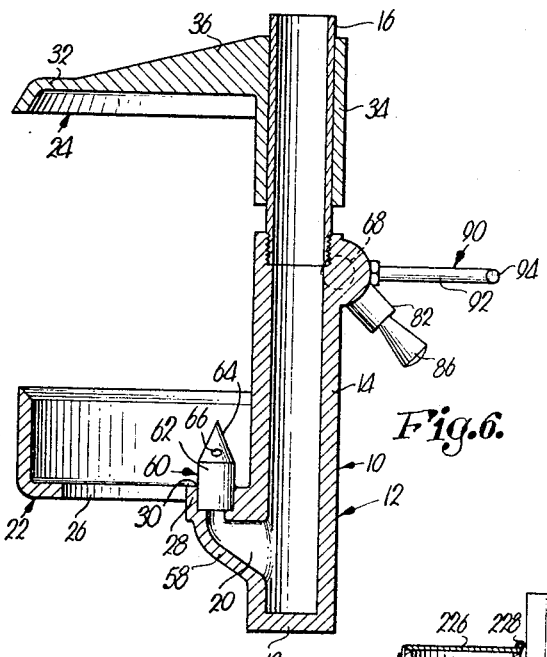

United States Patent Office 3,282,470
Patented Nov. 1, 1966

3,282,470
AUTOMATIC SALT DISPENSER FOR POPCORN MACHINES
Frank J. Thomas, Overland Park, Kans., assignor to Manley, Inc., Kansas City, Mo., a corporation of Missouri
Original application May 13, 1963, Ser. No. 279,994. Divided and this application July 13, 1965, Ser. No. 482,656
18 Claims. (Cl. 222—166)

This is a division of my copending application Serial No. 279,994, filed May 13, 1963, and entitled "Automatic Salt Dispenser For Popcorn Machines."

This invention relates to automatic popcorn machines and, more particularly, to apparatus for dispensing a measured amount of a granular seasoning material into the popping kettle of such a machine.

In automatic popcorn machines, the dispensing of salt into the popping kettle of such a machine has always been a problem in view of the fact that salt, having a high affinity for moisture, bridges the openings and passages directing the same into a kettle if, in fact, there is moisture present on the structure forming such openings and passages. The problem becomes more acute when heated vapors are emitted from the kettle as the latter is opened to admit the salt since the heat from the vapors gives rise to a condensate on the structure due to the water vapor in the air being heated.

Dispensers heretofore utilized for adding salt to the popping kettle of an automatic popcorn machine have either been too complicated mechanically for efficient machine operation, or generally have been unsuccessful because of being positioned too close to the kettle so as to be in the path of vapors emitted therefrom when the kettle is opened to receive the salt. The heat from the vapor and from radiation by the kettle causes the water vapor in the air to condense on the surfaces of the dispenser in line with the vapors from the kettle and over which the salt must pass to enter the kettle. As a result, the salt clings or adheres to the surfaces and eventually builds up a coating thereon which hinders the effective transfer of salt from the source to the kettle. Bridging of the passages through which the salt travels as it is directed to the kettle sometimes occurs so that the passage eventually becomes completely blocked and the operation of the machine will be interrupted until the passages are opened. In addition to this, such bridging militates against the dispensing of predetermined amounts of salt into the kettle. Thus, the popcorn in the kettle will not be properly seasoned if some of the salt adheres to the dispenser as the kettle is being charged with the salt.

The present invention provides a salt dispenser for automatic popcorn machines and which has been constructed with the view of overcoming the above-mentioned problems of salt dispensers heretofore utilized. To this end, the present invention provides a tiltable, salt-receiving tube coupled with a source of salt and normally disposed in a position with respect to the popping kettle so as to minimize or completely eliminate any tendency for heat from the kettle to cause condensation of water vapor thereon. Hence, the bridging effect of the salt is substantially prevented so that measured amounts of salt may be dispensed into the popping kettle each time the tube is tilted to discharge its contents of salt into the popping kettle.

The instant invention also provides means for mounting and opening a perforable container provided with a supply of granular material therein. When mounted, the container is disposed in a position such that when the tube is in its salt-receiving position, salt gravitates from the container and toward the tube until the salt reaches a predetermined level in the tube. Thereafter, no further salt flows into the tube until the latter has been emptied upon the tilting of the tube.

It is, therefore, the primary object of the present invention to provide apparatus for dispensing a predetermined amount of granular material having a high affinity for moisture into an area from which heated vapors emanate without substantially projecting the material to condensate created by the presence of such vapors so as to minimize or substantially eliminate the bridging effect caused by the material on the apparatus as a result of the material being contacted by the condensate.

Another object of the present invention is the provision of a tiltable, salt-receiving dispensing tube for an automatic popcorn machine which is disposed in such a manner to receive measured amounts of salt and being movable with respect to the popping kettle of the machine so that the tube, when tilted, is capable of dispensing the salt into the kettle without permitting substantial formation of condensate thereon due to vapors emitted from the kettle as the salt is being dispensed into the latter.

A still further object of the present invention is the provision of means on the tube of the aforesaid character for mounting a perforable container of salt thereon, and for piercing such container in such a manner so as to permit the gravitation of salt into the tube only to a predetermined level when the tube is in one position to thereby assure that a predetermined amount of salt is in the tube for subsequent dispensing into the popping kettle associated with the tube when the tube is tilted.

Another object of the present invention is the provision of structure for retaining the container in position on the tube and for piercing the container as the same is being retained, whereby the container need not be initially opened prior to the retention thereof by the structure to thereby prevent spillage or wasting of the salt when placing the container in position for use on the salt dispenser.

In the drawings:

FIG. 5 is an end elevational view on an enlarged scale of the apparatus of the present invention;

FIG. 6 is a cross-sectional view taken along line 6—6 of FIG. 5;

FIG. 7 is a top plan view of the apparatus illustrated in FIG. 5;

FIG. 8 is a plan view of a portion of the apparatus and illustrating the means for retaining the container in place on the dispensing tube, parts being in section to illustrate details of construction;

FIG. 9 is an enlarged, cross-sectional view of a portion of the apparatus and illustrating the structure therefor for coupling the same to a rotatable shaft; and FIG. 10 is a fragmentary view of the end of the mounting shaft which is adapted to be coupled to the apparatus for tilting the latter as the shaft is rotated in opposed directions.

FIG. 11 is a vertical cross-sectional view of a second embodiment of the dispenser forming the instant invention.

Figure 1:
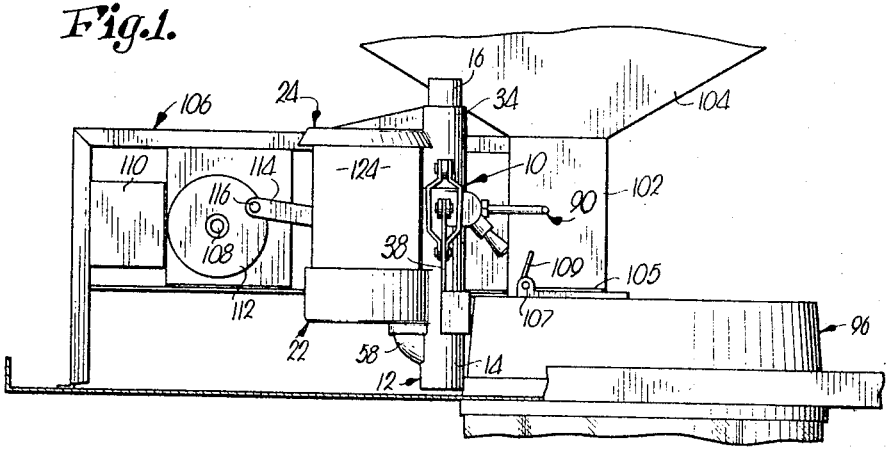
FIGURE 1 is a side elevational view of the dispensing apparatus which forms one embodiment of the present invention and illustrating the use thereof with the popping kettle of an automatic popcorn machine, the dispensing apparatus being shown in a material-retaining position thereof.

The material dispensing apparatus which forms a first embodiment of the present invention is denoted by the numeral 10 and includes a tube 12 having a normally lower section 14, and a normally upper section 16 threaded into section 14 as is clear in FIG. 6. Section 14 is provided with a closure 18 at the normally lowermost end thereof and further provided with an opening 20 in the side thereof spaced from closure 18. As shown in FIG. 6, the normally upper end of section 16 is open and provides a discharge for material within tube 12 when the latter is tilted so that closure 18 is above the open end of section 16.

Tube 12 serves as a support for a pair of relatively shiftable retaining members 22 and 24 for releasably clamping a material container therebetween. Member 22 is cup-shaped as is clear in FIGS. 5, 6 and 8 and provided with a central opening 26 in the bottom thereof, into which opening 26 extends a boss 28 having an aperture 30 therethrough. Member 22 is rigid to and extends laterally from section 14 in underlying relationship to member 24. Member 24 is in the nature of a plate 32 rigid to a sleeve 34 reciprocably mounted on section 16, as is clear in FIG. 6. A gusset 36 is integral with plate 32 and sleeve 34 for strengthening member 24.

Means is provided for shifting sleeve 34 toward and away from section 14 and includes a lever 38 mounted for pivotal movement on an ear 40 on section 14 by a pivot pin 42. A linkage 44 is pivoted at one end thereof by a pivot pin 46 to lever 38 intermediate the ends of the latter. The opposite end of linkage 44 is coupled by means of a pivot pin 48 to an ear 50 on sleeve 34. As lever 38 swings about the axis of pin 42 in opposed directions, sleeve 34 is reciprocated longitudinally of section 16 toward and away from section 14. When lever 38 is substantially parallel with section 14, and when pin 42 is between pins 46 and 48, sleeve 34, and thereby member 24, is in a substantially fixed position with respect to member 22. In this position, pin 46 is substantially aligned with or to the side of a line passing through pins 42 and 48.

A secondary sleeve 52 is rigid to sleeve 34 and receives a guide rod 54. The lower end of guide rod 54 is rigidly secured to an extension 56, the latter in turn being rigidly mounted on and extending transversely of section 14 adjacent the normally upper end of the latter. Guide rod 54 assures that sleeve 34 does not rotate about section 16 as sleeve 34 reciprocates longitudinally of tube 12.

A conduit 58 intercommunicates opening 20 with aperture 30 of member 22 as is clear in FIG. 6. A piercing element 60 has a cylindrical, tubular portion 62 disposed within aperture 30 and extending outwardly therefrom. A conical head 64 forms a continuation of portion 62 and is provided with a series of openings 66 communicating with the interior of portion 62. Thus, the interior of element 60 is in communication with conduit 58 and thereby section 14. It is noted that element 60 is coupled to section 14 at a location such that the plane parallel with the bottom of member 22 is spaced above the plane of closure 18.

Extension 56 is provided with a bore 68 therein for receiving the enlarged end 70 of a shaft 72, the latter being mounted for rotation on an automatic popcorn machine broadly denoted by the numeral 74 and illustrated in FIGS. 1–4. End 70 is provided with a transverse bore 76 therethrough which forms a pair of diametrically opposed recesses for receiving the tip 78 of a plunger 80 carried by extension 56 intermediate the ends thereof as is clear in FIGS. 5 and 7.

Plunger 80 is received within a tubular projection 82 carried by extension 56 and communicating with bore 68. A coil spring 84 within projection 82 biases tip 78 in a direction toward end 70 so that tip 78 is releasably retained within bore 78 at either end thereof.

A cap 86 is secured to the end of plunger 80 opposite to the end to which tip 78 is secured. Cap 86 serves to limit the inward travel of plunger 80. A bore 88 is provided in extension 56 in a diametrically opposed location with respect to projection 82 to permit the insertion and removal of plunger 80 in the position thereof shown in FIG. 9. To this end, cap 86 may be threadably mounted on plunger 80.

An L-shaped component 90 is rigid to and extends laterally from extension 56 as is clear in FIGS. 5–7. Component 90 is provided with a leg 92 perpendicular to the longitudinal axis of tube 12 and to the axis of shaft 72 coupled with extension 56. A leg 94 integral with leg 92 is, therefore, parallel with shaft 72.

Apparatus 10 is adapted to be coupled to an automatic popcorn machine 74 adjacent one side of and slightly above the popping kettle 96 of machine 74. Kettle 96 is preferably of the type illustrated and described in the disclosure Serial No. 592,028, entitled "Kettle Assembly For Popcorn Machines," now U.S. Letters Patent No. 2,902,920, issued September 8, 1959.

The details of construction of kettle 96 are substantially the same as those of the disclosure and the latter are incorporated herein by reference to disclose the details of construction of kettle 96.

Figure 4:
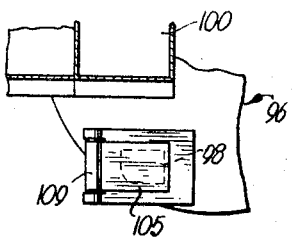
FIG. 4 is a fragmentary plan view of the popcorn machine and illustrating the material-receiving opening in the popping kettle and the lid for removably closing the opening.

Kettle 96 is provided with a salt-receiving opening 98 shown in FIG. 4, and a popcorn-receiving opening 100 spaced from opening 98 and in alignment with a chute 102 thereabove. Chute 102 is in communication with and beneath a hopper 104 for containing a supply of popcorn. Means (not shown) is provided, of course, for directing a measured amount of popcorn into chute 102 for subsequent discharge into kettle 96 through opening 100.

A lid 105 is pivotally mounted by means of a pin 107 on the top of kettle 96 and is disposed for removably closing opening 98 therein. A flanged projection 109 is rigid to lid 105 and extends upwardly therefrom as is clear in FIG. 1 when lid 105 covers opening 98. Lid 105 is disposed so that when the same is open, projection 109 extends downwardly below the plane of the top of kettle 96 as is clear in FIG. 2. In this position, projection 109 engages kettle 96 to limit the downward travel of lid 105.

Shaft 72 is rotatably carried on machine 74 and projects outwardly from a support 106 in spaced relationship to and in parallelism with a rotatable shaft 108 operably coupled with an electric motor 110 carried on support 106. A disc 112 is rigid to shaft 108 and rotates therewith. A link 114 is pivotally mounted at one end thereof by means of a pin 116 to the periphery of disc 112. The opposite end of link 114 is pivotally coupled by means of a pin 118 to a crank arm 120 rigid to shaft 72. A stop 122 is carried by support 106 intermediate the shafts 72 and 108 as is clear in FIG. 3 for limiting the swinging movement of shaft 72.

In operation, apparatus 10 is releasably coupled to shaft 72 by means of plunger 80 and disposed in the position illustrated in FIG. 1 with tube 12 in an upright, material-retaining position. In this position, component 90 extends outwardly from tube 12 and overlies a peripheral portion of kettle 96. Also, members 22 and 24 project outwardly from tube 12 on the side of the latter remote from the side adjacent kettle 96.

A closed container 124 of generally perforable material is then positioned between members 22 and 24 when member 24 is shifted to the end of its path of travel remote from member 22 by lever 38. Since container 124 is perforable, the same is pierced by element 60 when member 24 is shifted toward member 22 under the action of lever 38. Element 60 is disposed for entering container 124 so that openings 66 are within container 124 so as to direct salt from container 124 into conduit 58 and thence into section 14. Members 22 and 24 effectively retain container 124 in place on tube 12 with the discharge opening in container 124 formed by element 60 in position for permitting the gravitational flow of salt from container 124.

With the container 124 in place, salt gravitates therefrom through element 60, conduit 58 and then into section 14 until the salt reaches a predetermined level in the latter. Generally, the level of the salt in section 14 will extend upwardly to a point in horizontal alignment with element 60. Thus, a predetermined amount of salt will be within section 14. As tube 12 tilts to discharge the salt therein the opening made in container 124 will then be swung into a position so that salt may not gravitate from container 124 until the same is again in the position shown in FIG. 1.

Figure 2:
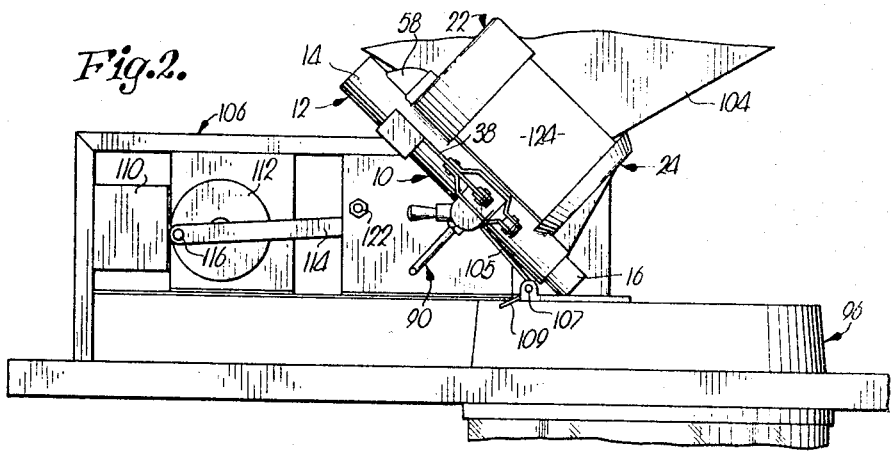
FIG. 2 is a view similar to FIG. 1 but showing the apparatus in a material-dispensing position with respect to the popping kettle.
Figure 3:
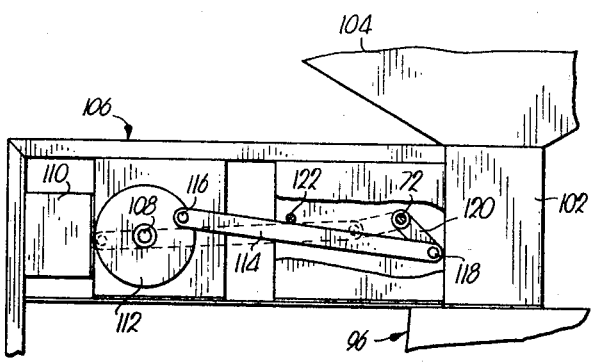
FIG. 3 is a fragmentary view of the automatic popcorn machine with the dispenser apparatus removed therefrom to illustrate the means for tilting the apparatus.

Upon operation of motor 110, shaft 108 is caused to rotate in a counterclockwise sense when viewing FIGS. 1–3, so that shaft 72 is rotated in a clockwise sense to tilt tube 12 toward kettle 96. Leg 94 engages projection 109 to rotate the latter in a counterclockwise sence when viewing FIGS. 1 and 2 so as to open the opening 98. Tube 12 continues to rotate until the open end of section 16 is aligned with opening 98. The salt in tube 12 is then caused to discharge into kettle 96 since tube 12 is now in a material-dispensing position. Salt, being freely flowable, immediately passes into kettle 96 when tube 12 reaches the position of FIG. 2 and during the time when link 114 is in the dashed-line position of FIG. 3.

Motor 110 is controlled so as to cause shaft 108 to make one complete rotation for each salt dumping cycle. At the end of the cycle of rotation disc 112 stops in a position with tube 12 disposed uprightly as is shown in FIG. 1. Thereupon, salt from container 124 gravitates into section 14 through element 60 and conduit 58 to a predetermined level within section 14. Apparatus 10 is, therefore, ready to discharge a measured or predetermined amount of salt into kettle 96 prior to the next popping operation.

The position of apparatus 10 is such as to minimize the condensation of moisture on any part of tube 12 when apparatus 10 is in the position shown in FIG. 1. In addition, when apparatus 10 is in the position of FIG. 2, section 16 is only momentarily aligned with opening 98 so that only a minimum amount of the heated vapors passing through opening 98 will contact section 16. The material of section 16 is preferably of a noncorrosive nature such as stainless steel or the like, to substantially prevent or minimize the corrosive effects of the salt over extended periods of time.

It is to be pointed out that component 90 is configured so that leg 94 thereof engages lid 105 to return the latter to the position thereof shown in FIGS. 1 and 4 covering opening 98 when apparatus 10 moves from the material-dispensing position to the material-retaining position. Thus, component 90 controls the opening and closing of lid 105 for all positions of tube 12.

Apparatus 10 may be effectively removed from shaft 72 by shifting plunger 80 so that tip 78 moves out of bore 76. Thereupon, apparatus 10 may be manually moved off end 70. When the salt in container 124 has been completely utilized, member 24 is shifted away from member 22 to permit the removal of container 124 from between members 22 and 24. A full container 124 is then disposed in proper position between members 22 and 24 and then firmly clamped by shifting lever 38 to the position thereof shown in FIGS. 1 and 2.

It is clear that container 124 need not be opened prior to the use thereof between members 22 and 24. Thus, there is no wasting of salt when the container 124 is placed in operation between members 22 and 24. Element 60 is configured so that a neat hole or opening is formed in container 124 to thereby obviate sealing means in and around element 60 to prevent the escape of salt from container 124.

Another embodiment of the instant invention is illustrated in FIG. 11 and is to be utilized on a popcorn machine much in the manner of machine 74 to which apparatus 10 is coupled. The embodiment of FIG. 11 includes a tube 212 having a normally lower section 214 and an upper section 216 removably coupled with section 214. A container 218 is integral with tube 212 and provided with an opening 220 in the bottom wall 222 thereof, opening 220 being placed in communication with the interior of section 214 by a conduit 224. A lid 226 is hinged at 228 to the normally uppermost end of container 218 for removably closing the latter. A fastener 230 releasably couples lid 226 to container 218.

Tube 212 is releasably coupled to a rotatable shaft 232 by means of a plunger assembly 234 of the same construction as shown in FIG. 9. Means 236 is provided on tube 212 for opening and closing a lid covering the salt-receiving opening of a popcorn kettle.

In operation, lid 226 is swung to open container 218 and salt is poured into the latter to fill the same. A predetermined quantity of the salt will immediately gravitate through opening 220 and conduit 224 into section 214 until the salt has filled the lower end of section 214 to a predetermined level. Lid 226 is then closed so that salt will not spill from container 218 as the latter is tilted along with tube 212.

After the salt has been dispensed from tube 212 and as the tube 212 returns to its normal vertical position as shown in FIG. 11, the predetermined amount of salt will fill the lower end of section 214. Thus, such predetermined amount of salt will be dispensed from tube 212 when the latter is tilted upon rotation of shaft 232.

Having thus described the invention, what is claimed as new and desired to be secured by Letters Patent is:

1. Apparatus for dispensing a measured amount of a flowable material, said apparatus comprising:
    a tube having an open end and a closed end;
    means mounting the tube for tilting movement from a material-retaining position to a material-dispensing position;
    a container adapted to receive a supply of said material and provided with a discharge opening therein;
    means mounting said container externally of the tube in a location permitting gravitational flow of the material through said opening and with the opening being at a higher elevation than said closed end of the tube when the latter is in said material-retaining position; and
    an elongated, unobstructed conduit communicating with said tube at a lower elevation than said opening and extending upwardly to said opening for receiving the flow of material from said opening when said tube is in said material-retaining position and for directing a quantity of the same into said tube until said material reaches a predetermined level therewithin, whereby said quantity is dispensed through the open end of the tube when the latter is tilted into said material-dispensing position.

2. In combination:
    a popcorn popping kettle having a material-receiving opening therein; and
    apparatus for dispensing a measured amount of a granular material into said kettle through said opening thereof from a container having a supply of said material therein and a material-discharge opening, said apparatus comprising an open end tube having a closure at one end thereof, means mounting said tube above said material-receiving opening in the kettle for tilting movement relative to the latter, means coupled with said tube for tilting the same from a material-retaining position to a material-dispensing position aligned with said material-receiving opening in the kettle, means carried by said tube for retaining said container thereon and disposed to position the discharge opening in the container above said one end of the tube and in a location permitting gravitational flow of the material from the container when said tube is in said material-retaining position, and conduit means communicating with said tube and aligned with said discharge opening when said container is retained on said tube, said conduit means being disposed for receiving a quantity of said material and for directing the same toward said tube until said material reaches a predetermined level in said tube, whereby said quantity of material is dispensed into said material-receiving opening in the kettle when said tube is tilted into said material-dispensing position.

3. In combination:
a popcorn popping kettle having a material-receiving opening therein; and
apparatus for dispensing a measured amount of a granular material into said kettle through said opening thereof from a perforable container having a supply of said material therein, said apparatus comprising an open end tube having a closure at one end thereof, means mounting said tube above said material-receiving opening in the kettle for tilting movement relative to the latter, means coupled with said tube for tilting the same from a material-retaining position to a material-dispensing position aligned with said material-receiving opening in the kettle, means carried by said tube for retaining said container thereon, a piercing element secured to said retaining means and disposed for piercing and entering said container when the latter is retained on said tube, said element having a material flow passage and disposed above said one end of the tube when the latter is in said material-retaining position, and conduit means communicating said tube with said material passage of said element and disposed for directing a quantity of said material toward said tube until said material reaches a predetermined level therewithin, whereby said quantity of material is dispensed into said material-receiving opening in the kettle when said tube is tilted into said material-dispensing position.

4. The combination as set forth in claim 3, and a lid pivotally mounted on the kettle and disposed for removably closing said material-receiving opening therein, and structure carried by said tube and engageable with said lid for pivoting the latter to a location opening said material-receiving opening when said tube is tilted into said material-dispensing position.

5. The combination as set forth in claim 4, said lid having a projection thereon, said structure being engageable with said projection for pivoting said lid into said location.

6. The combination as set forth in claim 4, said structure being disposed for pivoting said lid into a disposition closing said material-receiving opening when said tube is returned to said material-retaining position.

7. The combination as set forth in claim 4, said structure having a leg extending outwardly from said tube substantially perpendicular to the longitudinal axis of said tube and to the axis of tilting movement thereof.

8. The combination as set forth in claim 3, said retaining means including a pair of relatively shiftable, container-engaging retaining members, and means for shifting one of said members relative to the other member and disposed to clamp said container between said members.

9. Apparatus for dispensing a measured amount of a flowable material, said apparatus comprising:
a tube having an open end and a closed end;
means mounting the tube for tilting movement from a material-retaining position to a material-dispensing position;
a container adapted to receive a supply of said material and provided with a discharge opening therein;
and means rigidly mounting said container on said tube externally of the latter in a location permitting gravitational flow of the material through said opening and with the opening being at a higher elevation than said closed end of the tube when the latter is in said material-retaining position; and
an elongated, unobstructed conduit communicating with said tube at an elevation lower than said opening and extending upwardly to said opening for receiving the flow of material from said opening when the tube is in said material-retaining position and for directing a quantity of the same into said tube until said material reaches a predetermined level therewithin, whereby said quantity is dispensed through the open end of the tube when the latter is tilted into said material-dispensing position.

10. Apparatus as set forth in claim 9, said container having an open, normally uppermost end, and a lid swingably carried on said container and disposed for removably closing said end.

11. Apparatus for dispensing a measured amount of granular material comprising:
an assembly including a container and a tube, said container being adapted to contain a supply of said material and having a bottom provided with a discharge opening therein, said tube having an open end and a closed end and being mounted externally of the container;
means swingably mounting said assembly for movement from a first position with said open end of the tube being above the closed end thereof to a second position with said closed end being above said open end, said discharge opening being spaced at a higher elevation than said closed end when said assembly is in said first position;
an elongated, unobstructed conduit communicating with said discharge opening and extending downwardly to the interior of said tube when the assembly is in said first position, whereby a measured amount of said material will gravitate downwardly through said conduit into said tube when the assembly is in said first position and will be dispensed from the tube when the assembly is moved into said second position; and
means coupled with said assembly for swinging the latter in opposed directions whereby the assembly may be moved from said first position to said second position and then returned to said first position.

12. Apparatus as set forth in claim 11, wherein said tube is provided with an aperture spaced from said closed end thereof, said conduit interconnecting said aperture and said discharge opening.

13. Apparatus as set forth in claim 11, wherein said container is provided with an open top, there being a lid removably closing said open top to prevent the discharge of material through said top when said assembly is moved into said second position.

14. Apparatus as set forth forth in claim 11, wherein said tube is provided with a pair of sections in end-to-end relationship, one of said sections being releasably coupled to the other section.

15. Apparatus as set forth in claim 14, wherein said one section defines the upper portion of the tube when the assembly is in said first position, said one section being formed from a non-corrosive material.

16. Apparatus as set forth in claim 15, wherein said one section is formed from stainless steel.

17. Apparatus as set forth in claim 11, wherein said tube is in advance of said container in the direction of rotation of the assembly as the latter moves from said first position to said second position.

18. Apparatus for dispensing a measured amount of salt comprising:
an assembly including a container, a tube and means rigidly securing the tube to the container externally of the latter, said container being adapted to contain a supply of salt and having a bottom, a side wall, and an open top, said bottom having a discharge opening therein, said tube having a closed end and an open end;

a lid hinged to the container and being movable relative thereto into and out of closing relationship to said open top thereof;

means releasably maintaining said lid in closing relationship to said open top, said securing means being disposed to mount the tube on the outer surface of said side wall with the longitudinal axis of the tube being substantially parallel with the central vertical axis of the container;

means swingably mounting said assembly for movement from a first position with said open end of the tube being above the closed end thereof to a second position with said closed end being above said open end, said discharge opening being spaced above said closed end when said assembly is in said first position, said tube having an aperture spaced at a lower elevation than said discharge opening when the assembly is in said first position;

an elongated, unobstructed conduit placing said discharge opening in communication with said aperture, whereby salt directed into said conduit through said discharge opening from said container may gravitate in a measured amount into said tube through said aperture when said assembly is in said first position; and means coupled with said mounting means for swinging the assembly in opposed directions between said positions, whereby salt within said tube may be dispensed therefrom as said assembly is moved into said second position and said measured amount of salt will again gravitate into said tube as said assembly moves into said first position.

References Cited by the Examiner

UNITED STATES PATENTS

| | | | |
|---|---|---|---|
| 971,259 | 9/1910 | Effantin | 222—457 X |
| 2,309,234 | 1/1943 | Bonander | 222—456 |
| 2,423,784 | 7/1947 | Mackey | 222—456 |

ROBERT B. REEVES, *Primary Examiner.*

LOUIS J. DEMBO, *Examiner.*

N. L. STACK, *Assistant Examiner.*